H. MAYS ET AL

June 7, 1932. ARTIFICIAL BAIT Re. 18,488

Original Filed Feb. 26, 1931

Inventors

H. Mays

S. H. Kirkland

By Arthur Minnick

Attorney

Reissued June 7, 1932

Re. 18,488

UNITED STATES PATENT OFFICE

HUBERT MAYS AND SANFORD HOLMES KIRKLAND, OF TAMPA, FLORIDA

ARTIFICIAL BAIT

Original No. 1,820,670, dated August 25, 1931, Serial No. 518,400, filed February 26, 1931. Application for reissue filed April 8, 1932. Serial No. 604,130.

This invention relates to artificial bait for fishing, and particularly to improvements in the well known pork rind bait by which its efficiency is greatly increased.

Pork rind is flexible and when it is cut into relatively narrow strips and attached to a hook, the bait wiggles when drawn through the water, resembling a live minnow. Fish attempting to seize such bait, frequently take hold of the rind only, too far back from the hook to be caught.

The principal object of the present invention is to connect a hook to the central portion of the flexible bait in such manner as to leave the front and rear ends freely flexible, with the prong or barbed end of the hook close to the rear or trailer portion of the bait.

A further object of the invention is to provide a means for pivotally connecting the flexible bait to a fishing line or to a hook by a swivel joint having a shape that will cause the bait to turn around its own axis as it travels through the water.

Another object of the invention is to provide a securing means for attaching the hook to the tough rind to prevent its disengagement and to hold the barbed end close to the rind.

Other objects of the invention will appear in connection with the description of a few typical embodiments of the invention illustrated in the accompanying drawing, in which, Figure 1 is a plan view of a strip of pork rind showing the prong of a hook extending through an opening in the rind;

Figure 1:
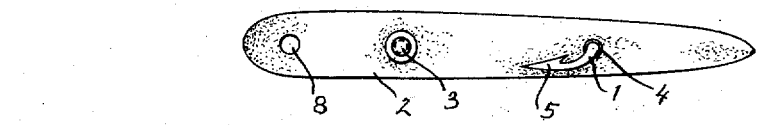
Figure 2:
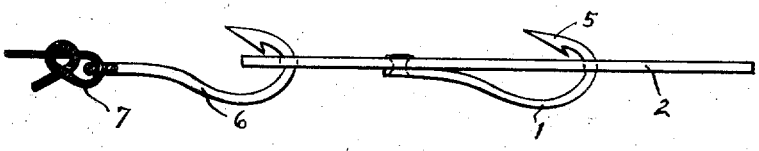
Figure 2 is an edge view showing the relation of the same hook to the bait and also indicating the bait as placed upon another hook secured to a line.
Figure 3:
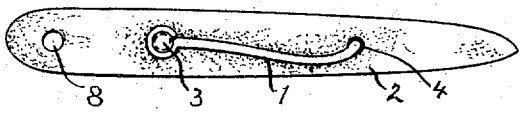
Figure 3 is a plan view similar to Figure 1 but showing the opposite side of the bait.

The present device consists essentially of a strip of pork rind having a fish hook firmly secured to its central portion, leaving both ends of the rind free to bend to produce the wiggling motion which causes it to resemble a live minnow. The hook 1 in Figures 1, 2, and 3, is shown as secured at its eye to the strip of rind 2 as by a rivet 3, the rind having a hole 4 to permit the passage of the prong 5 to project on the opposite side of the strip from the shank. The hook will preferably be shaped to cause the prong to lie close to the surface of the rind which is free to move laterally upon the curved portion of the hook. The attaching portion at the eye will be held by the rivet 3 substantially parallel with the plane in which the strip will lie when extended and the shank will be bent away from this plane and then recurved so that when the prong is in position through the hole 4, the barb will lie close to the surface of the freely movable rind which will thus function as a weed guard for the hook. Also the hook will thus be less conspicuous and it should be made of a color as nearly the same as that of the rind as is practicable.

As shown in Figure 2, the strip of rind 2 is placed upon a main hook 6 which may be tied upon a line 7 or which may form part of a suitable lure.

It is a common practice to attach a piece of pork rind or the like as a flexible wiggling tail-strip for a rigid lure of wood, celluloid, or metal provided with a rear hook. Fish striking at the flexible tail member frequently seize it too far back to reach the hook upon the lure. With the device of the present invention, the barbed hook is mounted with the prong well toward the rear end of the flexible member without interfering with the free movement of the tail portion, and there is also a flexible portion of the strip between the point of attachment of the rivet 3 holding the hook upon the rind, and the hole 8 in the rind engaged by the hook 6. Without any interference with the desirable wiggling movement of the rind strip, a hook has been placed well at the rear in the best location to catch the fish.

Figure 4:
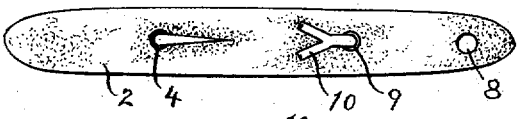
Figures 4 and 5 are a plan view and an edge view respectively of a pork rind bait in which the hook has one end shaped to provide an attaching terminal to take the place of the usual eye.
Figure 5:
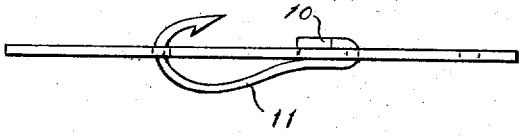
Figure 6:
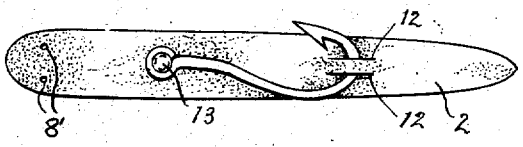
Figure 6 is a plan view of a modified form of bait in which the hook lies substantially parallel with one side of the flexible rind with the prong near one edge of the rind.

It will be evident that any other suitable means may be used instead of the rivet 3 to secure the auxiliary hook to the rind. In Figures 4 and 5, the hook is modified in structure so that in place of an eye, the attaching end is bent upon itself to receive the rind which has a hole 9 for the shank to pass through. The end of the shank is bifurcated at 10 and formed with pronged tips which are driven into the rind as indicated in Figure 5. The hook 11 has its barbed end passed through a hole 4 identical with the one shown in Figure 1.

When the rind is to be used with a lure which holds the strip on edge, the hook may have the eye formed parallel with the plane of the curved portion of the hook, and the barb will be placed through two slits 12 to lie with the point close to the upper edge of the strip. The rear end will be provided with two holes 8′ to receive the hook 6 or a similar hook. The rivet 13 corresponds to the rivet 3 of Figure 1.

Figure 7:
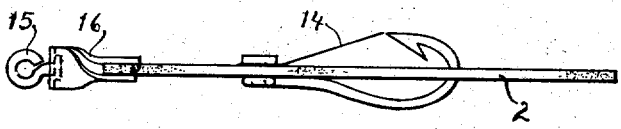
Figure 7 is an edge view of a still further modification in which the centrally located hook has a weed guard, and the flexible bait has a twisted swivel connection at one end to cause and permit rotation of the bait.
Figure 8:
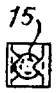
Figure 8 is an end view of the swivel member before attachment to the rind.
Figure 9:
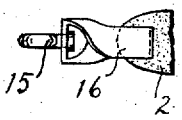
Figure 9 is a fragmentary view of one end of the structures shown in Figure 7, as seen from one side.

In Figure 7, the hook is similar to that of Figure 2 with the addition of a light spring 14 acting as a weed guard. The rind is provided at its front end with a swivel member which may consist of two elements, a headed loop member 15 and a twisted plate 16 perforated centrally to receive the member 15 and having its ends pronged to be driven into the rind. The twist in the flat metallic plate 16 will cause it to rotate on the member 15 so that the rind will be given a whirling movement as it wiggles through the water.

Pork rind is so tough and tenacious that there is no danger of tearing out the hook; it is very flexible and it has other good qualities such as appearance, availability, and cheapness which make it a very desirable material, but it is to be understood that the substitution of any other suitable material having the requisite strength, flexibility, and appearance is contemplated as within the scope of the invention, and it is evident that many other modifications of details of construction may be made within the reasonable interpretation of the accompanying definitions of the invention.

Although the invention is shown and described with the shank of the hook extending through the pork rind, it is not intended to limit the invention to this particular construction since the shank portion of the hook may be free of the pork rind, except where the eye of the hook is riveted to the latter, without materially affecting the efficiency or deceptiveness of the bait.

What is claimed is:

1. An artificial bait comprising a strip of pork rind or the like having an opening for the passage of a hook, and a hook having a barbed end extending through the opening and a shank secured to the central portion of the strip whereby both ends of the strip are left freely flexible.

2. An artificial bait comprising a strip of pork rind or the like having an opening for the passage of a hook, and a hook having a barbed end extending through the opening and a shank secured to the central portion of the strip at a distance from the opening such that the portion of the strip between the point of attachment of the shank and the opening is free to move relatively to the hook.

3. An artificial bait comprising a strip of pork rind or the like, means secured to the strip to cause and to permit it to rotate when drawn through the water, and a hook having its shank secured to the rind and the barbed end extending through the rind.

4. An artificial bait comprising a main hook, a strip of pork rind or the like having means for attachment to the main hook, and an auxiliary hook independent of the main hook and carried by said pork rind.

5. An artificial bait comprising a strip of pork rind or the like, and a hook permanently secured thereto and solely supported thereby so as to partake of the vibratory movement of the pork rind.

6. An artificial bait comprising a strip of pork rind or the like, a hook attached to the pork rind intermediate the ends thereof, and means at one end of the pork rind for attaching it to a fish line.

7. An artificial fish bait comprising a pair of fish hooks, and a strip of pork rind or the like constituting the sole connection of one of said hooks to the other.

8. An artificial fish bait comprising a pair of spaced fish hooks, and a strip of pork rind removably connected to one hook and connected to the other hook the pork rind constituting the sole means of connection between the hooks.

HUBERT MAYS.
SANFORD HOLMES KIRKLAND.